Nov. 24, 1953     H. N. SIMPSON     2,659,927
LEG AND CASTER MOUNT
Filed Sept. 8, 1951
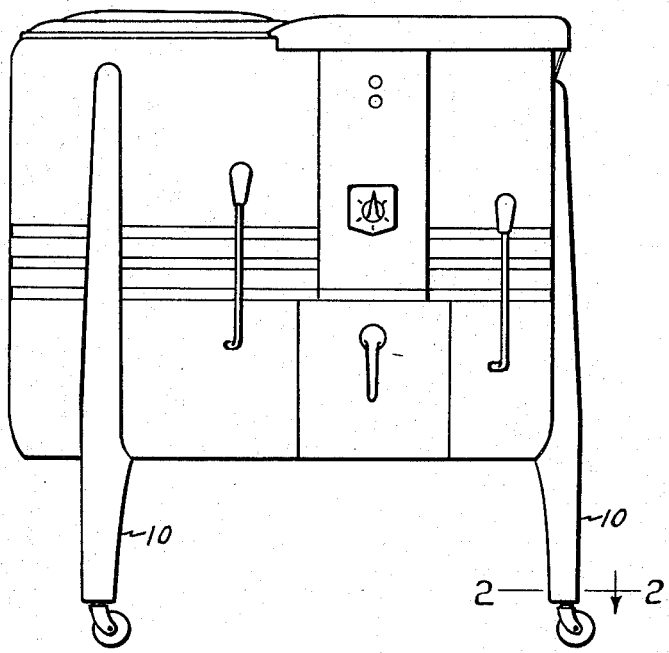
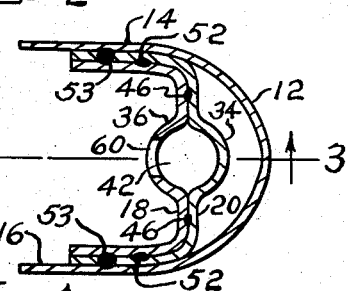
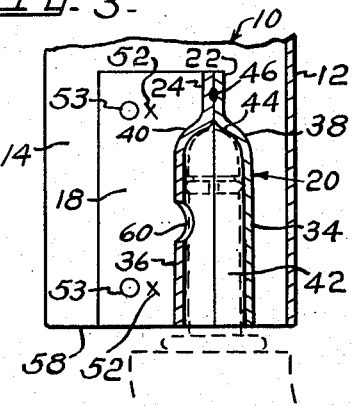
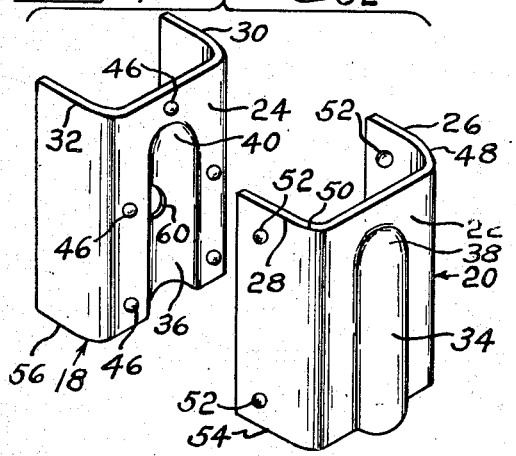
INVENTOR
HAROLD N. SIMPSON
BY
ATTORNEY Patented Nov. 24, 1953

2,659,927

UNITED STATES PATENT OFFICE 2,659,927

LEG AND CASTER MOUNT

Harold N. Simpson, Detroit, Mich., assignor to Easy Washing Machine Corporation, Syracuse, N. Y., a corporation of Delaware Application September 8, 1951, Serial No. 245,731

2 Claims. (Cl. 16—29)

This invention relates to a leg construction for appliances, and more particularly to a caster mount therefor.

In appliances and other relatively heavy apparatus adapted to be mounted on casters, the stresses imposed upon the casters may be unusually high, due to the weight of such appliances, and the rough nature of the floor over which the appliances are frequently rolled.

The present invention is directed to a caster mount construction adapted for use in a metal channel section leg. The construction utilizes a pair of stamped members secured together to form in effect a bore or socket and thrust bearing for a caster stem, such members having flanks adapted for nesting within the leg channel. Such parts are especially adapted to attachment within the leg channel by spot welding, with the welds acting in shear, whereby great strength, as well as ease in fabrication results.

The above and other novel features of the invention will appear more fully hereinafter from the following detailed description when taken in conjunction with the acompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a side elevation of an appliance having the caster mount incorporated in the legs thereof;

Figure 2 is a sectional view taken substantially on the line 2—2 of Figure 1;

Figure 3 is a sectional view taken substantially on the line 3—3 of Figure 2; and Figure 4 is a perspective view of the members forming the caster mount.

Referring to the drawings, there is shown an appliance having legs 10 formed of channel members of substantially U-section. The legs in cross section comprise a curved section 12 and side flanks 14 and 16. The caster mount comprises a pair of nesting channel section members 18 and 20, each member having web portions 22 and 24, respectively, and side flanges 26 and 28 and 30 and 32. The web 24 and flanges 30 and 32 are adapted to nest within the flanges 26 and 28, with the web 24 in flat contact with the web 22.

To provide a caster mount, each of the webs 22 and 24 have formed therein a longitudinally extending semi-cylindrical portion, the web 22 having such portion 34 formed outwardly with respect to the flanges 26 and 28, and the web 24 having such portion 36 formed inwardly with respect to the flanges 30 and 32. The cylindrical portions 34 and 36 terminate with substantially quarter spherical portions 38 and 40. It will thus be seen that there is provided a semi-cylindrical socket 42 bounded at the upper end by a semi-spherical thrust bearing socket 44. The channel members 18 and 20 are adapted to be welded together through a series of projection welds between the webs 22 and 24, one of the members, for example 18, being provided with a number of projection welding blisters 46, so that the members, when nested, and squeezed between welding electrodes, will have their respective webs securely joined together in flat contact with each other.

The side flanges 26 and 30, and 28 and 32, may also be projection welded together, one of the members, for example 20, being provided with projection welding blisters 52. The flanges are pressed together between welding electrodes, and the channel members are thus securely fastened together to form a sub-assembly.

When the channel members 18 and 20 have been secured together in the manner described, the assembly is positioned between the flanks 14 and 16 of the legs, and the slight curved portions 48 and 50 of the member 20 are seated against the curvature 12 of the leg channel. When so positioned, the channel members are welded to the flanks by a series of spot welds, as indicated at 53.

The channel members will preferably be mounted within the U-section legs with the lower edges 54 and 56 flush with the lower edge 58 of the leg. The semi-cylindrical portion 36 of the channel member 18 may be provided with an aperture 60 into which may be positioned a holddown hook for securing the appliance to a frame bottom of a shipping crate with the caster removed.

It will be seen that the channel members 18 and 20, when secured together and within the U-section leg in the manner described, provides in effect a cylindrical socket for the reception of the shank of a caster. It will be seen that the diameter of such socket may be closely controlled by the accurate stamping of the parts, and that a split ring carried by the caster may frictionally engage the wall of the socket to retain the caster shank in position. At the same time, the semi-spherical socket end 44 formed at the upper ends of the semi-cylindrical socket-forming portions will form a satisfactory thrust bearing for the semi-spherical end of a caster shank.

The structure thus provided may be fabricated from stamped metal parts, and while the channel members and the U-section leg are illustrated as having parallel flanks and flanges, it will be understood that such flanges and flanks may be angularly disposed, if desired. Whether parallel, as shown, or angularly disposed, it will be seen that the caster mount members are secured to the legs by welds acting in shear, with resulting high strength whereby the caster mount members are able to resist the most severe stresses likely to be imposed upon the caster in rolling heavy appliances across an irregular floor surface. At the same time, a secure hold-down adapted to withstand the most severe stresses likely to occur in shipment is provided. While specific types of welds have been referred to as suitable from a production standpoint, in practice other forms of fastening may be resorted to.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A channel leg and caster mount comprising a chanel sectioned leg having spaced substantially parallel flanks, a pair of nesting channel members each having a web portion and flanges, one being nested within the other, with the outer surfaces of the flanges and web of the inner member in contact with the inner surfaces of the flanges and web of the outer member, said outer member having the outer surfaces of its flanges in surface contact with the inner walls of the flanks of said leg channel, said web portions being disposed in substantially a vertical plane interconnecting the flanges thereof, said web portions having opposed semi-circular socket-forming portions providing together a substantially cylindrical socket adapted to receive the shank of a caster, said web members being welded together on either side of and along said semi-circular portions, and said flanges of said nesting channel members being welded together and to the flanks of said channel section legs.

2. A channel leg and caster mount comprising a channel sectioned leg having spaced substantially parallel flanks, a pair of nesting channel members each having a web portion and flanges, one being nested within the other, with the outer surfaces of the flanges and the web of the inner member in contact with the inner surfaces of the flanges and web of the outer member, said outer member having the outer surfaces of its flanges in surface contact with the inner walls of the flanks of said leg channel, said web portions being disposed in substantially a vertical plane interconnecting the flanges thereof, said web portions having opposed semi-circular socket-forming portions extending to the lower edge of said web portions, and terminating adjacent the upper end in substantially quarter spherical segment portions, providing together a substantially cylindrical socket adapted to receive the shank and ball end of a caster, said web members being welded together on either side of and along said semi-circular portions, and said flanges of said nesting channel members being welded together and to the flanks of said channel sectioned legs.

HAROLD N. SIMPSON.

References Cited in the file of this patent

UNITED STATES PATENTS

| Number | Name | Date |
| --- | --- | --- |
| 427,662 | Blandon et al. | May 13, 1890 |
| 1,230,986 | Bergland | June 26, 1917 |
| 1,342,500 | Finch | June 8, 1920 |
| 2,187,270 | Kirk | Jan. 16, 1940 |
| 2,254,651 | Herold | Sept. 2, 1941 |